US012160031B2

(12) United States Patent
Xiao et al.

(10) Patent No.: US 12,160,031 B2
(45) **Date of Patent: *Dec. 3, 2024**

(54) FEED NETWORK OF BASE STATION ANTENNA, BASE STATION ANTENNA, AND BASE STATION

(71) Applicant: HUAWEI TECHNOLOGIES CO., LTD., Guangdong (CN)

(72) Inventors: Weihong Xiao, Dongguan (CN); Zhiqiang Liao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,043

(22) Filed: Nov. 29, 2022

(65) Prior Publication Data

US 2023/0093260 A1 Mar. 23, 2023

Related U.S. Application Data

(63) Continuation of application No. 16/823,980, filed on Mar. 19, 2020, now Pat. No. 11,552,385, which is a (Continued)

(30) Foreign Application Priority Data

Sep. 19, 2017 (CN) ......................... 201710856022.1

(51) Int. Cl.
*H01Q 1/24* (2006.01)
*H01Q 1/38* (2006.01)
(Continued)

(52) U.S. Cl.
CPC ............... *H01Q 1/246* (2013.01); *H01Q 1/38* (2013.01); *H01Q 1/48* (2013.01); *H01Q 13/206* (2013.01);
(Continued)

(58) Field of Classification Search
CPC .... H01Q 1/246; H01Q 19/10; H01Q 21/0075; H01Q 13/206
See application file for complete search history.

(56) References Cited

U.S. PATENT DOCUMENTS

| | | | |
|---|---|---|---|
| 6,034,649 | A | 3/2000 | Wilson et al. |
| 6,072,439 | A | 6/2000 | Ippolito et al. |

(Continued)

FOREIGN PATENT DOCUMENTS

| | | |
|---|---|---|
| CN | 1231527 | 10/1999 |
| CN | 2758997 | 2/2006 |

(Continued)

OTHER PUBLICATIONS

Extended European Search Report issued in European Application No. 18857647.4 on Jul. 24, 2020, 15 pages.

(Continued)

*Primary Examiner* — Hasan Islam
(74) *Attorney, Agent, or Firm* — Fish & Richardson P.C.

(57) ABSTRACT

The present disclosure relates to base station antennas and base stations. One example base station antenna comprises an antenna array, a reflecting plate with a hole, a microstrip circuit comprising a first conductor strip, and a stripline cavity structure comprising a second conductor strip. The microstrip circuit and the stripline cavity structure are respectively located at opposite sides of the reflecting plate. The first conductor strip and the second conductor strip are connected through the hole.

21 Claims, 13 Drawing Sheets

Related U.S. Application Data continuation of application No. PCT/CN2018/101645, filed on Aug. 22, 2018.

(51) Int. Cl.
*H01Q 1/48* (2006.01)
*H01Q 13/20* (2006.01)
*H01Q 19/10* (2006.01)
*H01Q 21/00* (2006.01)

(52) U.S. Cl.
CPC ......... *H01Q 19/10* (2013.01); *H01Q 21/0075* (2013.01)

(56) References Cited

U.S. PATENT DOCUMENTS

| | | | | |
|---|---|---|---|---|
| 7,463,190 | B2 | 12/2008 | Zimmerman | |
| 7,619,580 | B2 | 11/2009 | Lenart et al. | |
| 10,027,022 | B2 * | 7/2018 | Zhou | H01Q 19/10 |
| 10,158,165 | B2 * | 12/2018 | Sledkov | H01Q 3/32 |
| 10,854,997 | B2 * | 12/2020 | Quitt | H01Q 1/241 |
| 10,879,602 | B2 | 12/2020 | Gatti | |
| 2005/0134517 | A1 * | 6/2005 | Gottl | H01Q 19/108 343/797 |
| 2006/0273865 | A1 | 12/2006 | Timofeev et al. | |
| 2009/0312057 | A1 * | 12/2009 | Moon | H01Q 1/246 455/562.1 |
| 2018/0248256 | A1 | 8/2018 | Xiao et al. | |
| 2018/0351246 | A1 | 12/2018 | Yu et al. | |

FOREIGN PATENT DOCUMENTS

| | | |
|---|---|---|
| CN | 101051706 | 10/2007 |
| CN | 101505007 | 8/2009 |
| CN | 102077419 | 5/2011 |
| CN | 102082327 | 6/2011 |
| CN | 103066381 | 4/2013 |
| CN | 104466426 | 3/2015 |
| CN | 102918710 | 7/2015 |
| CN | 205104602 | 3/2016 |
| CN | 105960737 | 9/2016 |
| CN | 106058416 | 10/2016 |
| CN | 106602281 | 4/2017 |
| CN | 106785465 | 5/2017 |
| CN | 206211029 | 5/2017 |
| CN | 106972267 | 7/2017 |
| CN | 107819198 | 3/2018 |
| EP | 1247311 | 10/2002 |
| EP | 3223368 | 9/2017 |
| RU | 2432646 | 10/2011 |
| WO | 2001041256 | 6/2001 |
| WO | 2001041257 | 6/2001 |
| WO | 2009132358 | 10/2009 |
| WO | 2016074593 | 5/2016 |
| WO | 2017070952 | 5/2017 |
| WO | 2017113147 | 7/2017 |

OTHER PUBLICATIONS

Office Action issued in Chinese Application No. 201710856022.1 on Dec. 18, 2019, 6 pages (with English translation).
Office Action issued in Chinese Application No. 201710856022.1 on Feb. 28, 2019, 19 pages (with English translation).
Office Action issued in Chinese Application No. 202010127980.7 on Dec. 2, 2020, 11 pages.
Office Action issued in Indian Application No. 202037011966 on Feb. 26, 2021, 5 pages.
Office Action issued in Russian Application No. 2020113595/28(023042) on Mar. 9, 2022, 17 pages (with English translation).
PCT International Search Report and Written Opinion issued in International Application No. PCT/CN2018/101645 on Nov. 12, 2018, 15 pages (with English translation).

* cited by examiner

FEED NETWORK OF BASE STATION ANTENNA, BASE STATION ANTENNA, AND BASE STATION

CROSS-REFERENCE TO RELATED APPLICATIONS

This application is a continuation of U.S. patent application Ser. No. 16/823,980, filed on Mar. 19, 2020, which is a continuation of International Application No. PCT/CN2018/101645, filed on Aug. 22, 2018. The International Application claims priority to Chinese Patent Application No. 201710856022.1, filed on Sep. 19, 2017. All of the aforementioned patent applications are hereby incorporated by reference in their entireties.

TECHNICAL FIELD

This application relates to the communications field, and in particular, to a feed network of a base station antenna, a base station antenna, and a base station.

BACKGROUND

With development of devices and progress of technologies, as a long-distance communication requirement becomes higher, an increasingly high requirement is imposed on an antenna gain. An array including a plurality of antennas can effectively increase an electrical size of an antenna, thereby providing a higher gain.

FIG. 1 shows a currently conventional base station antenna. An interior of a radome includes three parts: a radiating element 101, a reflecting plate 102 used for direction restriction, and a feed network installed on the reflecting plate to provide an amplitude and a phase for the radiating element.

In the conventional structure in FIG. 1, for example, the feed network usually includes devices such as a phase shifter 103. The radiating element is disposed on a front surface of the reflecting plate, the phase shifter is disposed on a back surface of the reflecting plate, and the phase shifter is connected to the radiating element by using a coaxial cable 104. This structure can adapt to different array arrangement. However, for a multi-array antenna, device arrangement on a back surface of a reflecting plate easily leads to problems of a large quantity of cables, complex assembly, and difficulty in laying out a feed network in a case of a plurality of arrays.

SUMMARY

Embodiments of this application provide a feed network of a base station antenna, a base station antenna, and a base station. The feed network and the base station antenna that are provided in the embodiments of this application have simple structures, and are easy to assemble and produce.

According to a first aspect, an embodiment of this application provides a feed network of a base station antenna. The feed network of the base station antenna includes a stripline cavity structure and a microstrip circuit, where the microstrip circuit is disposed on a front surface of a reflecting plate and is parallel to the reflecting plate, the microstrip circuit includes a first conductor strip and a dielectric substrate, the microstrip circuit is connected to the front surface of the reflecting plate, and the dielectric substrate is located between the conductor and the reflecting plate; the stripline cavity structure is disposed on a back surface of the reflecting plate, and first avoidance holes are provided on the reflecting plate; the stripline cavity structure includes at least one second conductor strip; and the stripline cavity structure is disposed on the back surface of the reflecting plate, and the second conductor strip passes through the first avoidance holes so as to be connected to the first conductor strip in the microstrip circuit. A position of a connection point between the second conductor strip and the first conductor strip in the microstrip circuit is a signal output port. In this embodiment of this application, the first avoidance holes are provided on the reflecting plate, so that the second conductor strip in the stripline cavity structure can pass through the reflecting plate and successfully perform feeding approximately with no loss. The feeding structure has a regular layout and a relatively small quantity of signal output ports. Particularly, when the base station antenna includes a plurality of antenna arrays, assembly space is saved. The regular layout of the feed network facilitates large-scale production.

In a possible implementation, the stripline cavity structure includes a cavity structure and the second conductor strip, the cavity structure includes a first ground plate, a second ground plate, and a baffle plate, a first end of the first ground plate is perpendicularly connected to the reflecting plate, a first end of the second ground plate is perpendicularly connected to the reflecting plate, one end of the baffle plate is connected to a second end of the first ground plate, and the other end of the baffle plate is connected to a second end of the second ground plate. The reflecting plate, the first ground plate, the second ground plate, and the baffle plate form the cavity structure. The cavity structure is a closed cavity structure, and the baffle plate is configured to block a signal.

In a possible implementation, the baffle plate includes at least one gap. The gap is rectangular, an extension direction of the gap is a signal input direction, and a position of the rectangular gap corresponds to a position of the second conductor strip. The gap facilitates overall assembly of the array antenna.

In a possible implementation, the stripline cavity structure includes a phase shifter, and the phase shifter includes a sliding medium, the second conductor strip, and the cavity structure; and the second conductor strip has a power division point, and the sliding medium covers a periphery of the power division point.

In a possible implementation, two ends of the second conductor strip each have a convex structure, and the convex structures pass through the first avoidance holes in an insulated manner to be electrically connected to a conductor of the microstrip circuit. The insulated manner may be: coating peripheries of the convex structures with an insulating material, or disposing a layer of insulation material on inner walls of the holes. The convex structures include a first convex structure on one end of the second conductor strip and a second convex structure on the other end of the second conductor strip, and the sliding medium slides between the first convex structure and the second convex structure. In this embodiment of this application, the first convex structure and the second convex structure are two protruding segments extending from the same power division point. The sliding medium is added to the stripline cavity structure to implement a function of the phase shifter, and two of the sliding medium between which the second conductor strip is sandwiched are moved to implement a phase change. In this embodiment of this application, the phase shifter may be assembled inside the stripline cavity structure, thereby saving the assembly space of the base station antenna. The feed network has a small physical size and a simple structure, and therefore is suitable for large-scale production.

In a possible implementation, a slot and an opening groove are provided on the baffle plate, the slot is parallel to the ground plate and is located on an inner plane of the cavity structure, and the opening groove is perpendicular to the slot; and the first avoidance holes are linearly arranged on the reflecting plate, and positions of the first avoidance holes that are linearly arranged correspond to a position of the slot. Two ends of the second conductor strip each have a convex structure; when the second conductor strip is assembled, a side edge of the second conductor strip is inserted from an inlet of the stripline cavity structure, to insert the second conductor strip into the slot, and an external force is applied to the opening groove; and when the side edge of the second conductor strip is pushed by the external force, the convex structures on the second conductor strip pass through the first avoidance holes so as to be electrically connected to the first conductor strip of the microstrip circuit. In this embodiment of this application, the slot is provided on the baffle plate, so that the position of the second conductor strip in the stripline cavity structure corresponds to the positions of the first avoidance holes during assembly. Then, the external force can be applied to the second conductor strip through the opening groove to facilitate assembly.

In a possible implementation, the second conductor strip is a 6 PCB board structure.

In a possible implementation, the microstrip circuit includes a ground layer, the ground layer is disposed in parallel to the reflecting plate, and the ground layer is coupled to the reflecting plate. In this embodiment of this application, in some scenarios, current transmission can be stopped, but signal transmission is not affected.

In a possible implementation, the microstrip circuit includes a ground layer, and the ground layer of the microstrip circuit and the reflecting plate are of an integrated structure. In this embodiment of this application, the integrated structure can improve efficiency of large-scale production.

In a possible implementation, there are N stripline cavity structures, where N is an integer greater than or equal to 2, signal transmission frequencies of second conductor strips in the N stripline cavity structures are different, and the microstrip circuit is a combiner. In this embodiment of this application, the feed network may include a combiner, so that the assembly space is saved. The feed network has a regular layout, is simple in assembly, and therefore is suitable for large-scale production.

In a possible implementation, there are N stripline cavity structures, where N is an integer greater than or equal to 2, signal transmission frequencies of second conductor strips in the N stripline cavity structures are the same, and the microstrip circuit is a power splitter. In this embodiment of this application, the feed network may include a power splitter, so that the assembly space is saved. The feed network has a regular layout, is simple in assembly, and therefore is suitable for large-scale production.

According to a second aspect, an embodiment of this application provides a base station antenna. The base station antenna includes a plurality of array antennas, each of the plurality of array antennas includes at least one radiating element, a reflecting plate, and a feed network, the radiating element is disposed on a front surface of the reflecting plate, and the feed network includes at least one stripline cavity structure and a microstrip circuit. The microstrip circuit is disposed on the front surface of the reflecting plate and is parallel to the reflecting plate, the microstrip circuit includes a conductor strip and a dielectric substrate, the microstrip circuit is connected to the front surface of the reflecting plate, and the dielectric substrate is located between the conductor and the reflecting plate; the stripline cavity structure is disposed on a back surface of the reflecting plate, and first avoidance holes are provided on the reflecting plate; the stripline cavity structure includes at least one second conductor strip; and the stripline cavity structure is disposed on the back surface of the reflecting plate, the second conductor strip passes through the first avoidance holes so as to be connected to the first conductor strip in the microstrip circuit, and the first conductor strip in the microstrip circuit is connected to a feed pin in the radiating element. In this embodiment of this application, the first avoidance holes are provided on the reflecting plate, so that the second conductor strip in the stripline can pass through the reflecting plate and successfully perform feeding approximately with no loss. The feeding structure has a regular layout and a relatively small quantity of signal output ports. Particularly, when the base station antenna includes a plurality of antenna arrays, assembly space is saved. The regular layout facilitates large-scale production.

In a possible implementation, the stripline cavity structure includes a cavity structure and the second conductor strip, the cavity structure includes a first ground plate, a second ground plate, and a baffle plate, a first end of the first ground plate is perpendicularly connected to the reflecting plate, a first end of the second ground plate is perpendicularly connected to the reflecting plate, one end of the baffle plate is connected to a second end of the first ground plate, and the other end of the baffle plate is connected to a second end of the second ground plate.

In a possible implementation, the stripline cavity structure includes a phase shifter, and the phase shifter includes a sliding medium, the second conductor strip, and the cavity structure; and the second conductor strip has a power division point, and the sliding medium covers a periphery of the power division point.

In a possible implementation, two ends of the conductor strip in the stripline cavity structure each have a convex structure, and the convex structures pass through the first avoidance holes in an insulated manner to be electrically connected to a conductor of the microstrip circuit. The convex structures include a first convex structure on one end of the second conductor strip and a second convex structure on the other end of the second conductor strip, and the sliding medium slides between the first convex structure and the second convex structure. In this embodiment of this application, the first convex structure and the second convex structure are two protruding segments extending from the same power division point. The sliding medium is added to the stripline cavity structure to implement a function of the phase shifter, and two of the sliding medium between which the second conductor strip is sandwiched are moved to implement a phase change. The phase shifter may be assembled inside the stripline cavity structure, thereby saving the assembly space of the base station antenna. The feed network has a small physical size and a simple structure, and therefore is suitable for large-scale production.

In a possible implementation, a slot and an opening groove are provided on the baffle plate, the slot is parallel to the ground plate and is located on an inner plane of the cavity structure, and the opening groove is perpendicular to the slot; and the first avoidance holes are linearly arranged on the reflecting plate, and positions of the first avoidance holes that are linearly arranged correspond to a position of the slot. Two ends of the second conductor strip each have a convex structure; when the second conductor strip is assembled, a side edge of the second conductor strip is inserted from an inlet of the stripline cavity structure, to insert the second conductor strip into the slot, and an external force is applied to the opening groove; and when the side edge of the second conductor strip is pushed by the external force, the convex structures on the second conductor strip pass through the first avoidance holes so as to be electrically connected to the conductor of the microstrip circuit. In this embodiment of this application, the slot is provided on the baffle plate, so that a position of the second conductor strip in the stripline cavity structure corresponds to the positions of the first avoidance holes during assembly. Then, the external force can be applied to the second conductor strip through the opening groove to facilitate assembly.

In a possible implementation, the microstrip circuit includes a ground layer, the ground layer is disposed in parallel to the reflecting plate, and the ground layer is coupled to the reflecting plate.

In a possible implementation, the microstrip circuit includes a ground layer, and the ground layer of the microstrip circuit and the reflecting plate are of an integrated structure.

In a possible implementation, there are N stripline cavity structures, where N is an integer greater than or equal to 2, signal transmission frequencies of second conductor strips in the N stripline cavity structures are different, and a circuit of the microstrip circuit is a combiner. In this embodiment of this application, the feed network may include a combiner, so that the assembly space is saved. The feed network has a regular layout, is simple in assembly, and therefore is suitable for large-scale production.

In a possible implementation, there are N stripline cavity structures, where N is an integer greater than or equal to 2, signal transmission frequencies of second conductor strips in the N stripline cavity structures are the same, and a circuit of the microstrip circuit is a power splitter. In this embodiment of this application, the feed network may include a power splitter, so that the assembly space is saved. The feed network has a regular layout, is simple in assembly, and therefore is suitable for large-scale production.

In a possible implementation, a polarization type of the radiating element is single polarization or dual polarization.

In a possible implementation, the reflecting plate includes one reflecting flat-plate and two reflecting side-plates, the two reflecting side-plates are respectively perpendicular to two ends of the reflecting flat-plate, and the reflecting plate is in a concave shape. In this embodiment of this application, because the reflecting plate is in a concave shape, the reflecting plate is more helpful in enhancing directivity of the antenna.

According to a third aspect, an embodiment of this application provides a base station, including a transceiver, where the transceiver is connected to the base station antenna according to the second aspect.

DESCRIPTION OF EMBODIMENTS

Embodiments of this application provide a feed network of a base station antenna, a base station antenna, and a base station, to improve product assembly efficiency.

In the specification, claims, and accompanying drawings of this application, the terms "first", "second", "third", "fourth", and the like (if any) are intended to distinguish between similar objects but do not necessarily indicate a specific order or sequence. It should be understood that data termed in such a way may be interchangeable in proper circumstances, so that the embodiments described herein can be implemented in other orders than the order illustrated or described herein. Moreover, the terms "include", "contain" and any other variants mean to cover non-exclusive inclusion, for example, a process, method, system, product, or device that includes a list of steps or units is not necessarily limited to those units, but may include other steps or units not expressly listed or inherent to such a process, method, product, or device.

Figure 1:
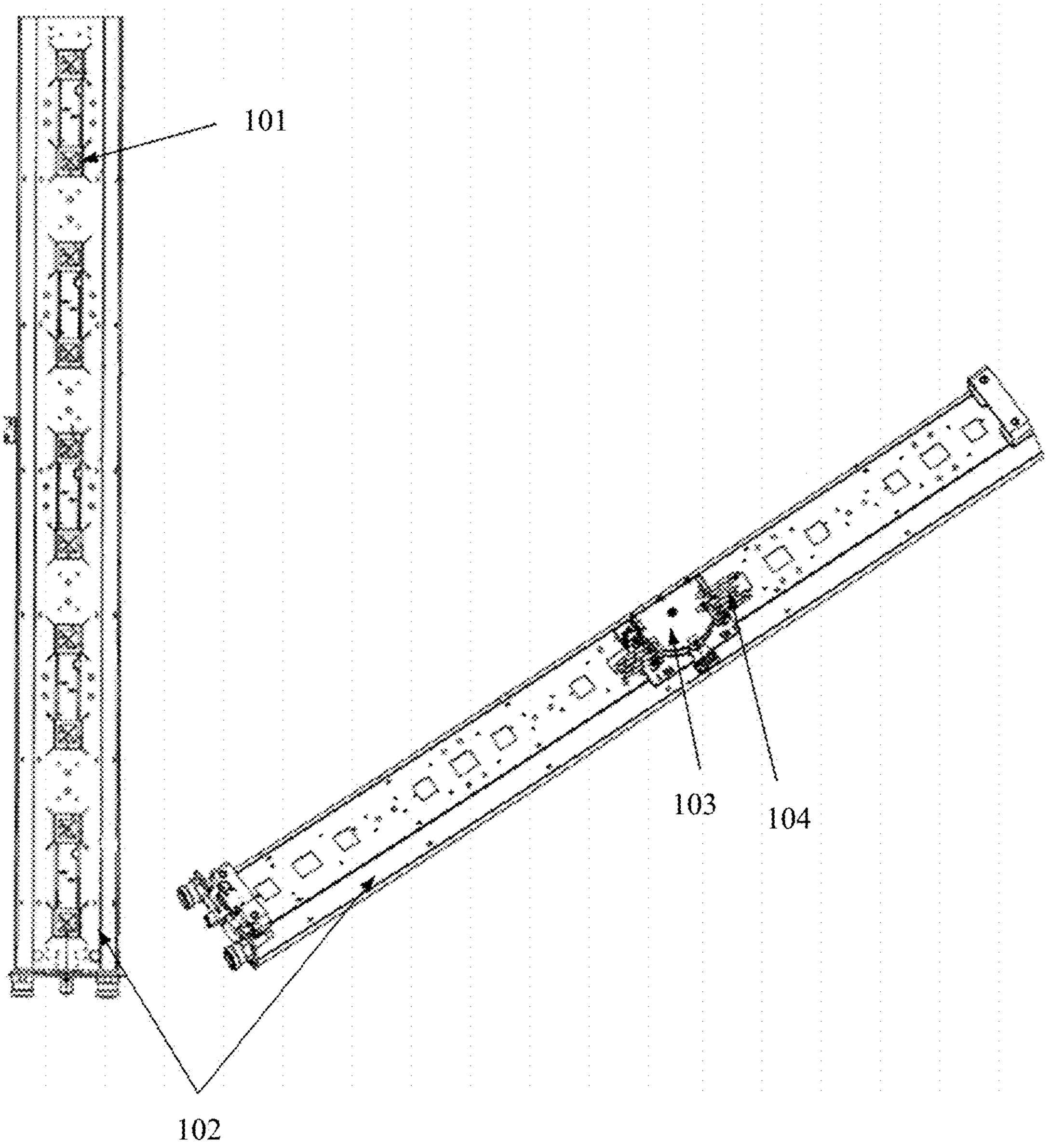
FIG. 1 (Prior Art)
FIG. 1 is a schematic diagram of an internal structure of a base station antenna in a conventional method.
Figure 2:
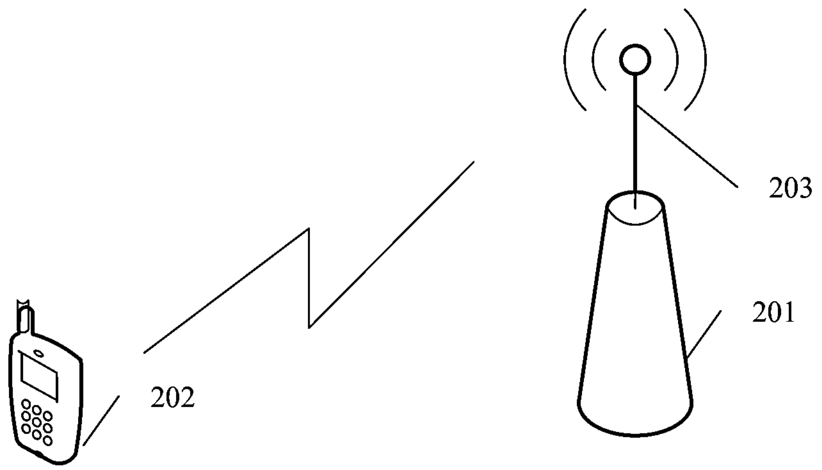
FIG. 2 is a schematic architectural diagram of a communications system according to an embodiment of this application.

This application is applied to a base station antenna in the field of wireless communications. The base station antenna is applied to a communications system. FIG. 2 is a schematic architectural diagram of a communications system according to an embodiment of this application. The communications system includes a mobile terminal and a base station. The base station includes a base station antenna, and the base station antenna is a connection device between the mobile terminal and a radio frequency front end in a wireless network, and is mainly configured to implement cell coverage of a radio signal. The base station receives, by using the base station antenna, a signal sent by the mobile terminal. Alternatively, the base station sends a signal to the mobile terminal by using the base station antenna.

For ease of understanding, terms used in the embodiments of this application are first explained.

Array antenna: an antenna system including several same single antennas that are arranged according to a specific geometric rule and that operate through a common feed network.

Feed network: an important component in a base station antenna, which connects an antenna port to an array element to form a path for transmitting a radio frequency signal, and implements functions such as impedance matching and amplitude and phase allocation. The feed network is closely related to performance of a base station array antenna, and a main function is transmitting a high-frequency current from a transmitter to a radiating element, or transmitting a high-frequency current from a radiating element to a transmitter.

Manners of the feed network include a stripline and a microstrip.

Figure 3:
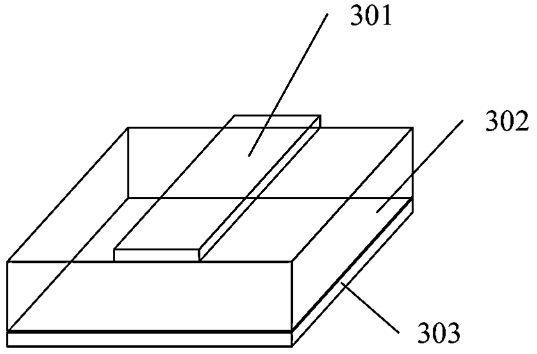
FIG. 3 is a schematic structural diagram of a microstrip according to an embodiment of this application.

Microstrip: Refer to FIG. 3. FIG. 3 is a schematic structural diagram of a microstrip. The microstrip is a microwave transmission line including a first conductor strip 301, a dielectric substrate 302, and a ground layer 303. The single first conductor strip 301 is disposed on one surface of the dielectric substrate 302, the other surface of the dielectric substrate 302 is connected to the ground layer 303, and the ground layer is a metal plate. A circuit including the microstrip is referred to as a microstrip circuit.

Figure 4:
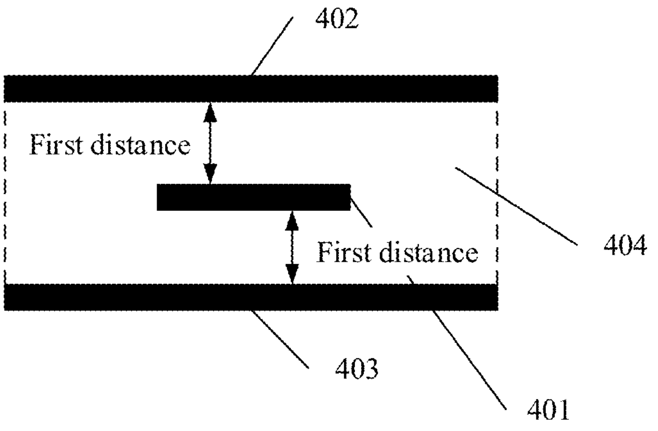
FIG. 4 is a schematic structural diagram of a cross section of a stripline according to an embodiment of this application.
Figure 5:
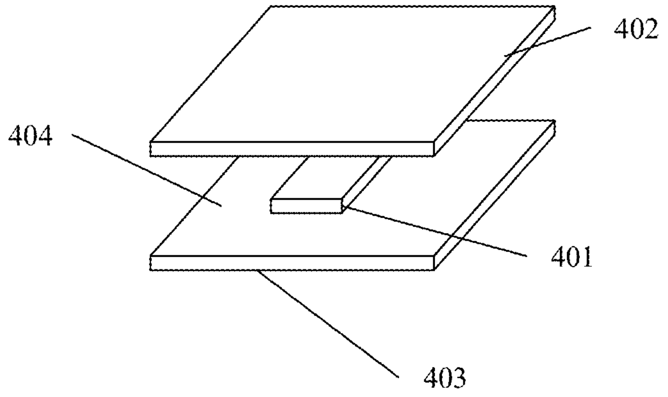
FIG. 5 is a schematic three-dimensional view of a stripline according to an embodiment of this application.

Stripline: Refer to FIG. 4 and FIG. 5. FIG. 4 is a schematic structural diagram of a cross section of a stripline, and FIG. 5 is a schematic three-dimensional view of the stripline. The stripline is a microwave transmission line including two ground plates and a second conductor strip 401 disposed between the two ground plates. The two ground plates include a first ground plate 402 and a second ground plate 403. A medium 404 is filled between the first ground plate 402 and the second ground plate 403. When d1 and d2 are filled with a same material, d1 and d2 may be approximately equal, or may be the same, where d1 is a first distance between the second conductor strip and the first ground plate, and d2 is a second distance between the second conductor strip and the second ground plate.

Figure 6:
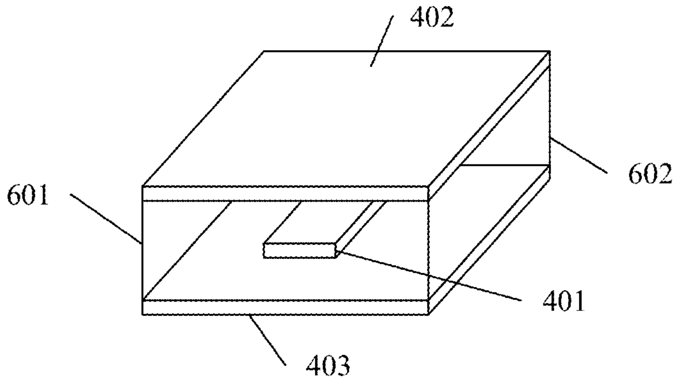
FIG. 6 is a schematic structural diagram of a stripline cavity structure according to an embodiment of this application.

Cavity structure: Refer to FIG. 6. FIG. 6 is a schematic structural diagram of a stripline cavity structure. The stripline cavity structure includes two ground plates of a stripline and two stripline side plates. The two stripline side plates include a first stripline side plate 601 and a second stripline side plate 602. One side edge of the first stripline side plate 601 is perpendicularly connected to the first ground plate 402, and the other side edge of the first stripline side plate 601 is perpendicularly connected to the second ground plate 403. One side edge of the second stripline side plate 602 is perpendicularly connected to the first ground plate 402, and the other side edge of the second stripline side plate 602 is perpendicularly connected to the second ground plate 403.

Reflecting plate: a metal plate, which is configured to enhance directivity of an antenna.

Radiating element: a component that converts current energy into electromagnetic energy and radiates the electromagnetic energy, or receives electromagnetic energy and converts the electromagnetic energy into current energy.

Half-wave dipole: a radiation structure including two metal arms that have approximately equal lengths. A length of each metal arm is approximately ¼ of a radiation wavelength (a total length is half a wavelength, and therefore the radiation structure is referred to as the half-wave dipole). The radiation structure is excited by using adjacent ends of the metal arms.

Polarization of an antenna: a change track of a vector end of an electric field vector in a radiation field. A polarization type includes linear polarization, and the linear polarization may be classified into single polarization and dual polarization.

Phase shifter: A device for changing a feeding phase of each radiating element of a remote electrical tilt antenna (namely, an array antenna) is referred to as the phase shifter. The phase shifter is a key component of a remote electrical tilt base station antenna, and can change a phase difference between radiating elements of the array antenna, so that a particular downtilt angle is formed a vertical beam of the antenna. The remote electrical tilt base station antenna can flexibly change beam coverage by adjusting the phase shifter, thereby meeting a requirement for optimizing a wireless network.

Figure 7:
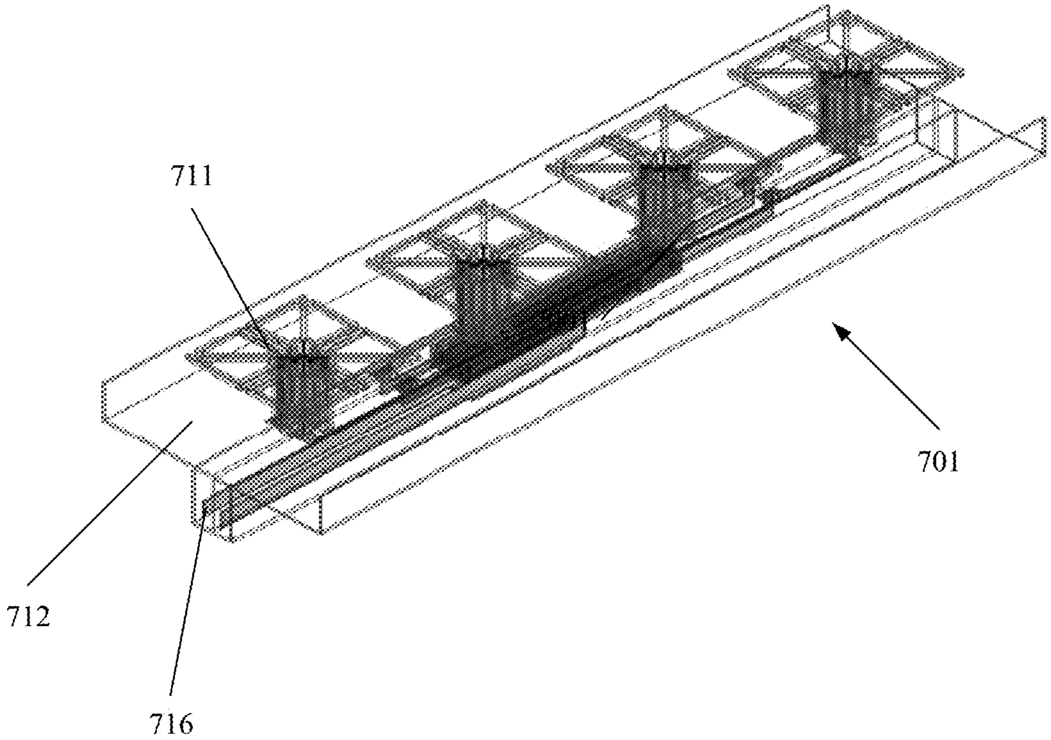
FIG. 7 is a schematic diagram of a three-dimensional structure of an array antenna of a base station antenna according to an embodiment of this application.
Figure 8:
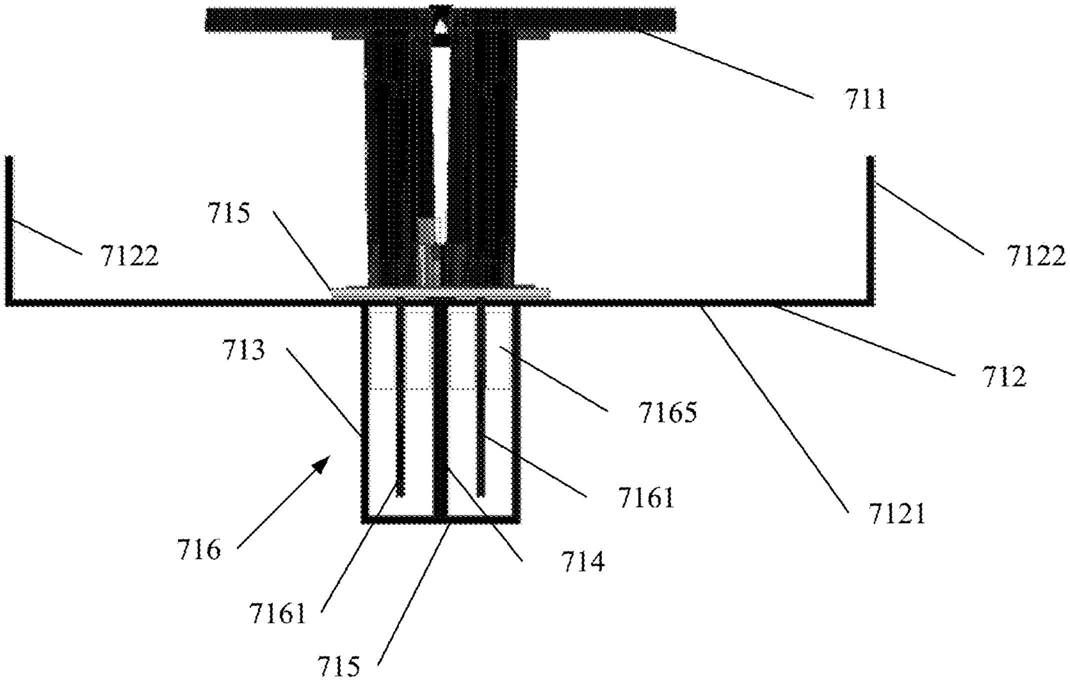
FIG. 8 is a schematic side view of an array antenna according to an embodiment of this application.

The embodiments of this application provide an embodiment of a base station antenna. Refer to FIG. 7 and FIG. 8. FIG. 7 is a schematic diagram of a three-dimensional structure of an array antenna 701 of a base station antenna. FIG. 8 is a schematic side view of the array antenna 701.

The base station antenna includes a plurality of array antennas 701, and each array antenna 701 includes a radiating element 711, a reflecting plate 712, and a feed network. For example, one base station antenna includes four array antennas 701, and one array antenna 701 may include four radiating elements 711, one reflecting plate 712, and a feed network. In this example, one array antenna 701 is first used as an example for description. It should be noted that, in an actual application, a quantity of array antennas 701 included in the base station antenna is not limited, and a quantity of radiating elements 711 in each array antenna 701 is not limited either.

The reflecting plate 712 includes one reflecting flat-plate 7121 and two reflecting side-plates 7122, the two reflecting side-plates are respectively perpendicular to two ends of the reflecting flat-plate, and the reflecting plate is in a concave shape.

The feed network includes a stripline cavity structure 716 and a microstrip circuit 715. The microstrip circuit 715 is disposed on a front surface of the reflecting plate 712, and is parallel to the reflecting plate 712. The stripline cavity structure 716 is disposed on a back surface of the reflecting plate 712, and the radiating element 711 is connected to the microstrip circuit 715.

Specifically, the microstrip circuit 715 includes a first conductor strip, a dielectric substrate, and a ground layer. In a possible implementation, there is a gap between the ground layer of the microstrip circuit 715 and the front surface of the reflecting plate 712, and the ground layer is coupled to the front surface of the reflecting plate 712. In another possible implementation, the ground layer and the reflecting plate 712 are of an integrated structure. It may be understood that the front surface of the reflecting plate 712 may be used as the ground layer of the microstrip circuit 715. In another possible implementation, the ground layer is directly connected to the front surface of the reflecting plate 712. It should be noted that, the front surface of the reflecting plate and the back surface of the reflecting plate are relative concepts. An external signal is radiated from the back surface of the reflecting plate to the front surface of the reflecting plate.

The stripline cavity structure 716 is disposed on the back surface of the reflecting plate 712, the stripline cavity structure 716 includes a cavity structure and a conductor strip of the stripline cavity structure 716, the cavity structure includes a first ground plate 713, a second ground plate 714, and a baffle plate 715, the first ground plate 713 and the second ground plate 714 are metal plates, a first end of the first ground plate 713 is perpendicularly connected to the reflecting plate 712, a first end of the second ground plate 714 is perpendicularly connected to the reflecting plate 712, one end of the baffle plate 715 is connected to a second end of the first ground plate 713, and the other end of the baffle plate 715 is connected to a second end of the second ground plate 714. It may be understood that the reflecting plate 712, the first ground plate 713, the second ground plate 714, and the baffle plate 715 form the cavity structure.

Figure 9:
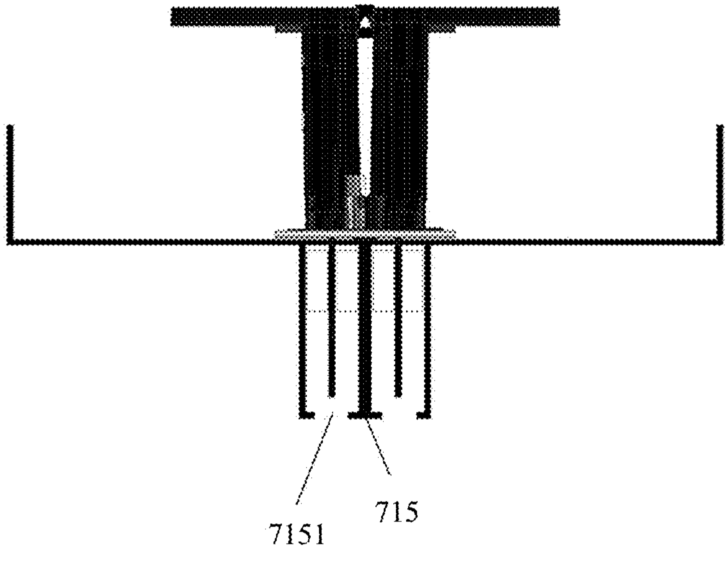
FIG. 9 is a schematic structural diagram of a schematic structural diagram of another stripline cavity structure according to an embodiment of this application.

In a possible implementation, the cavity structure is that shown in FIG. 7, the cavity structure is a closed cavity structure, and the baffle plate 715 is configured to block a signal. In another possible implementation, the cavity structure is that shown in FIG. 9, the baffle plate 715 includes at least one gap 7151. The gap 7151 is rectangular, an extension direction of the gap 7151 is a signal input direction, a signal is input from an opening end of the stripline cavity structure, and a position of the rectangular gap corresponds to a position of a second conductor strip 7161. The gap 7151 facilitates overall assembly of the array antenna.

The foregoing describes an overall structure of the base station antenna. The following describes how the feed network in the base station antenna forms a path for transmitting a radio frequency signal.

Figure 10:
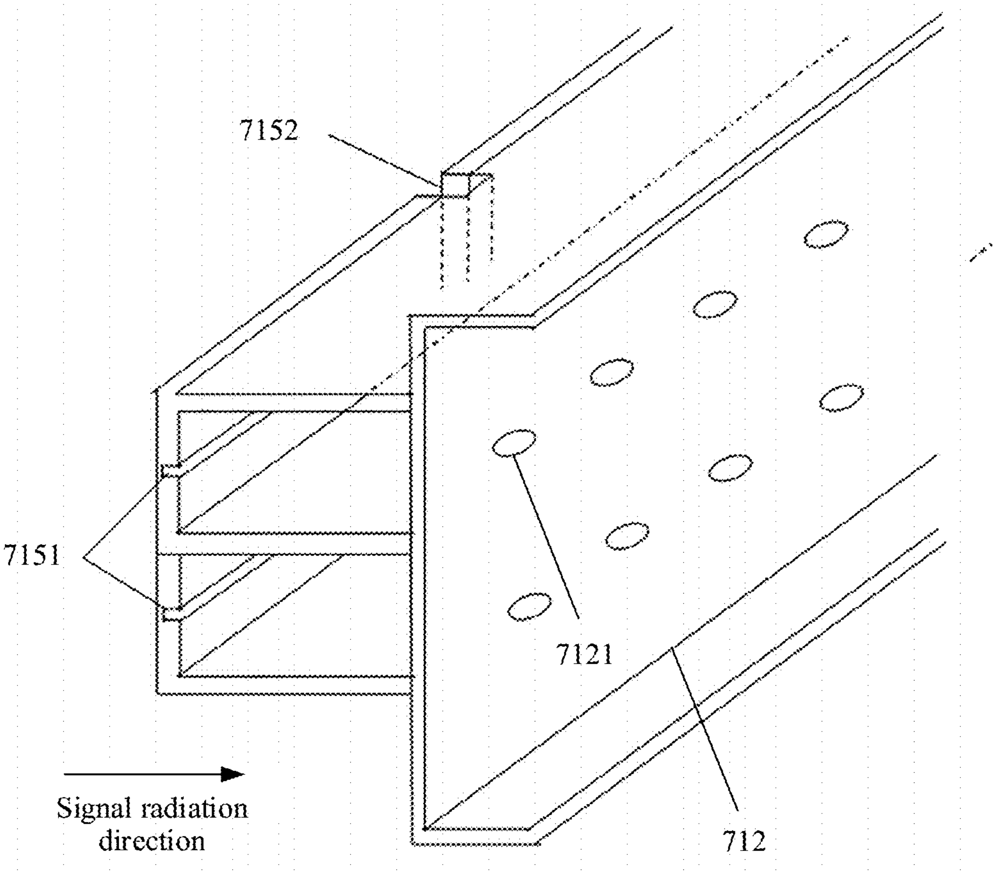
FIG. 10 is a schematic structural diagram of a reflecting plate according to an embodiment of this application.

Refer to FIG. 10. FIG. 10 is a schematic structural diagram of the reflecting plate 712. First avoidance holes 7121 are provided on the reflecting plate 712, so that the second conductor strip 7161 in the stripline can pass through the reflecting plate 712 and successfully perform feeding approximately with no loss.

In a possible implementation, if the ground layer of the microstrip circuit 715 and the reflecting plate 712 are of an integrated structure, only the first avoidance holes 7121 need to be provided on the reflecting plate 712. If the microstrip circuit 715 includes a ground layer, second avoidance holes need to be provided on the ground layer, and positions of the second avoidance holes correspond to positions of the first avoidance holes 7121, so that the second conductor strip 7161 in the stripline cavity structure 716 can pass through the first avoidance holes 7121 and the second avoidance holes so as to be electrically connected to the first conductor strip of the microstrip circuit 715.

Figure 11:
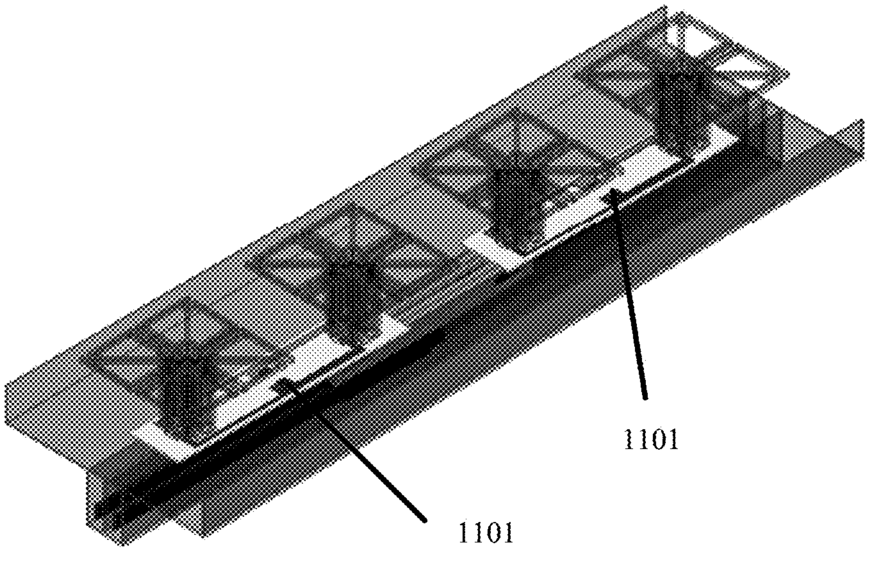
FIG. 11 is a schematic structural diagram of an array antenna according to an embodiment of this application.
Figure 12:
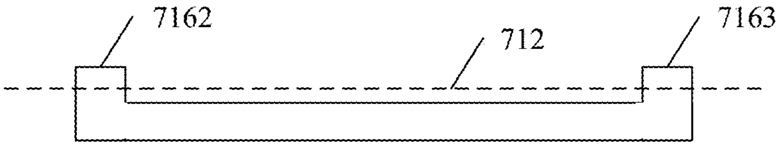
FIG. 12 is a schematic structural diagram of a second conductor strip according to an embodiment of this application.

Refer to FIG. 11 and FIG. 12. FIG. 11 is a schematic structural diagram of the array antenna 701, and FIG. 12 is a schematic structural diagram of the second conductor strip 7161. Referring to FIG. 12, two ends of the second conductor strip 7161 of the stripline cavity structure 716 each have a convex structure, and the convex structures pass through the first avoidance holes 7121 in an insulated manner to be electrically connected to the first conductor strip of the microstrip circuit 715. The insulated manner may be: coating peripheries of the convex structures with an insulating material, or disposing a layer of insulation material on inner walls of the holes. The convex structures include a first convex structure 7162 on one end of the conductor strip of the stripline cavity structure 716 and a second convex structure 7163 on the other end of the conductor strip of the stripline cavity structure 716. In FIG. 11, positions of connection points 1101 at which the convex structures are connected to the first conductor strip in the microstrip circuit 715 are signal output ports. The first avoidance holes 7121 and the second avoidance holes are provided, so that the second conductor strip 7161 in the stripline cavity structure can pass through the ground layer of the microstrip circuit and successfully perform feeding approximately with no loss.

Figure 13:
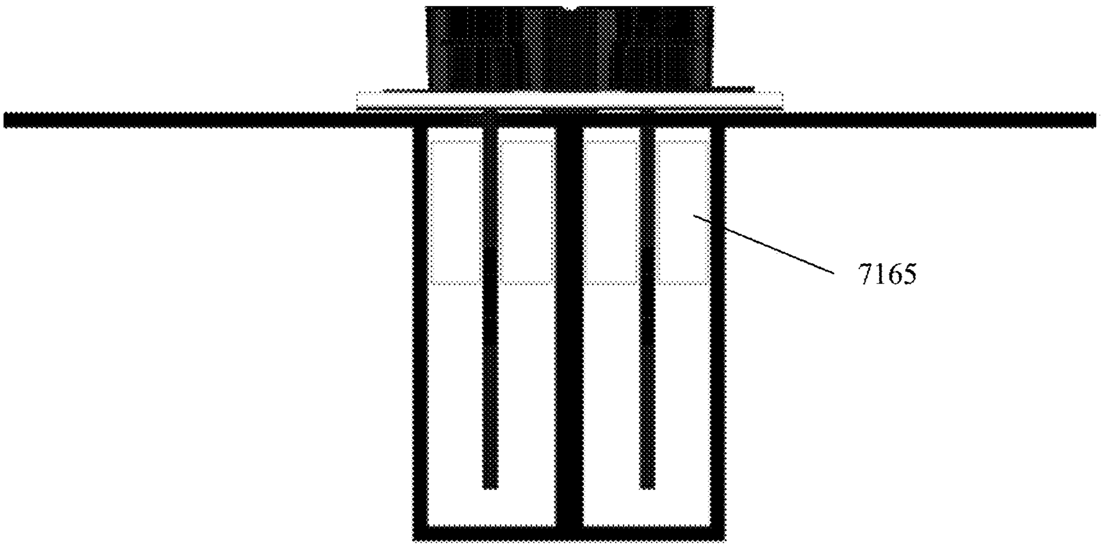
FIG. 13 is a schematic structural side view of an array antenna according to an embodiment of this application.
Figure 14:
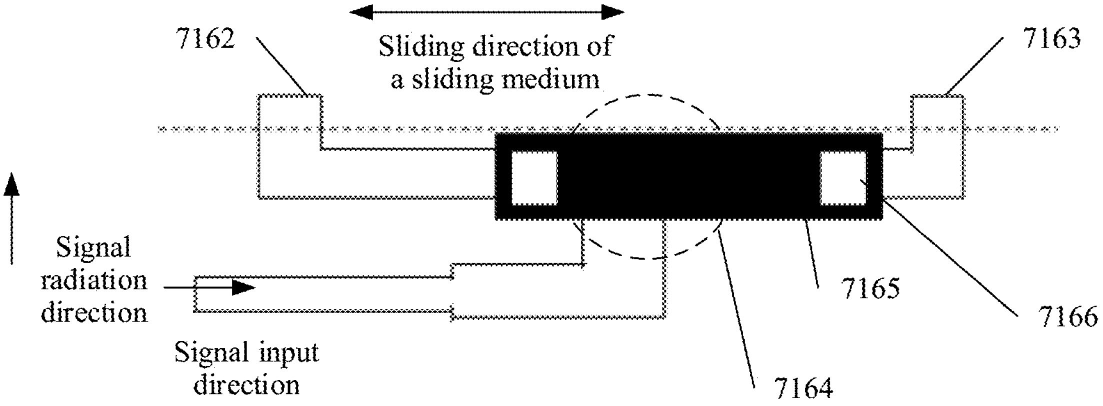
FIG. 14 is a schematic structural diagram of a second conductor strip in a stripline cavity structure according to an embodiment of this application.

Optionally, refer to FIG. 13 and FIG. 14. FIG. 13 is a schematic structural side view of the array antenna 701, and FIG. 14 is a schematic structural diagram of the second conductor strip 7161 in the stripline cavity structure 716. A filling medium included in the stripline cavity structure 716 is a sliding medium 7165. The sliding medium 7165 covers a periphery of a power division point 7164 on the second conductor strip 7161. The power division point 7164 is a point for power division. For example, the power division point 7164 may be disposed in a middle position on the second conductor strip 7161.

The sliding medium 7165 is disposed and slides between the first convex structure 7162 and the second convex structure 7163. The first convex structure 7162 and the second convex structure 7163 are two protruding segments extending from the same power division point 7164. The sliding medium 7165 is added to the stripline cavity structure 716 to implement a function of a phase shifter. The stripline cavity structure 716 includes two ground plates required by the phase shifter. Refer to FIG. 14. FIG. 14 is a schematic structural diagram of the sliding medium 7165. In FIG. 14, two of the sliding medium 7165 between which the second conductor strip 7161 is sandwiched are moved to implement a phase change, and a position covered by the sliding medium 7165 is a matching segment. The phase shifter has a plurality of working statuses. For example, a moving range of the medium is from 0 mm to 90 mm. Assuming that 15 mm is used as a step, the phase shifter has seven working statuses in total, and has a different impedance characteristic for each working status. Lengths and positions of square holes 7166 on the sliding medium 7165 are slightly adjusted to achieve a good matching characteristic, thereby adjusting a pattern characteristic of the base station antenna. In this embodiment of this application, the phase shifter may be assembled inside the stripline cavity structure 716, thereby saving assembly space of the base station antenna. The feed network has a small physical size, a small quantity of output ports, and a simple structure.

Optionally, refer to FIG. 10. In FIG. 10, a slot 7151 and an opening groove 7152 are provided on the baffle plate 715, the slot 7151 is parallel to the ground plate and is located on an inner plane of the cavity structure, and the opening groove 7152 is perpendicular to the slot 7151. The first avoidance holes 7121 are linearly arranged on the reflecting plate 712, and the positions of the first avoidance holes 7121 that are linearly arranged correspond to a position of the slot 7151. The two ends of the conductor strip of the stripline cavity structure 716 each have a convex structure. When the conductor strip of the stripline cavity structure 716 is assembled, a side edge of the conductor strip of the stripline cavity structure 716 is inserted from an inlet of the stripline cavity structure 716, to insert the conductor strip of the stripline cavity structure 716 into the slot 7151, and an external force is applied to the opening groove 7152. When the side edge of the conductor strip of the stripline cavity structure 716 is pushed by the external force, the convex structures on the conductor strip of the stripline cavity structure 716 pass through the first avoidance holes 7121 so as to be electrically connected to the first conductor strip of the microstrip circuit 715. In this example, the slot 7151 is provided on the baffle plate 715, so that the position of the second conductor strip 7161 in the stripline cavity structure 716 corresponds to the positions of the first avoidance holes 7121 during assembly. Then, the external force can be applied to the second conductor strip 7161 through the opening groove 7152 to facilitate assembly.

Optionally, the second conductor strip 7161 in the stripline cavity structure 716 is a PCB board structure. Similarly, to enable the PCB board structure to be easily assembled to protrude from the front surface of the reflecting plate, after the PCB board structure is assembled into the cavity, the PCB circuit is pushed at the opening groove 7152 to protrude from the front surface of the reflecting plate 712, so that the PCB board structure and the microstrip circuit 715 are perpendicularly crossed and electrically connected.

Figure 15:
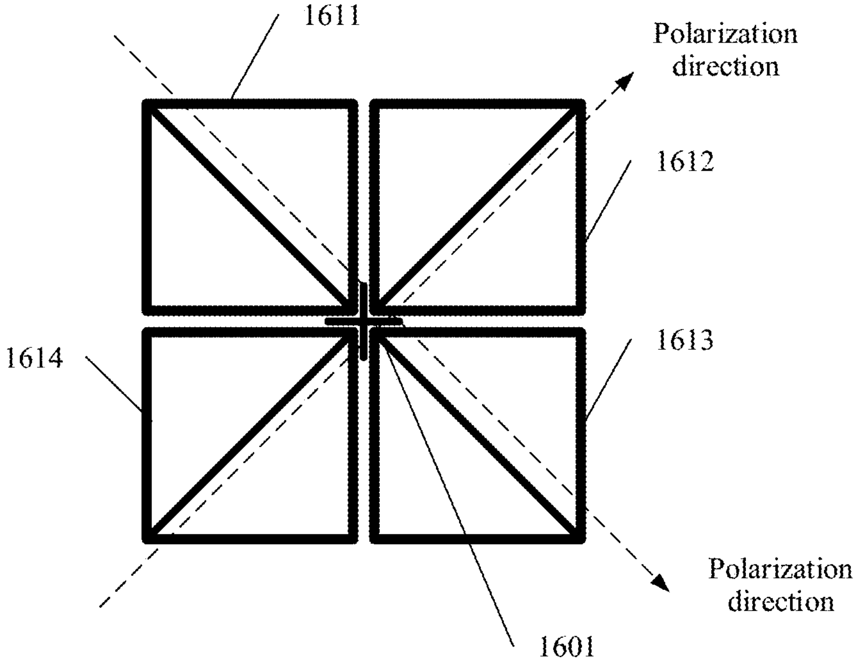
FIG. 15 is a schematic top view of a radiating element according to an embodiment of this application.
Figure 16:
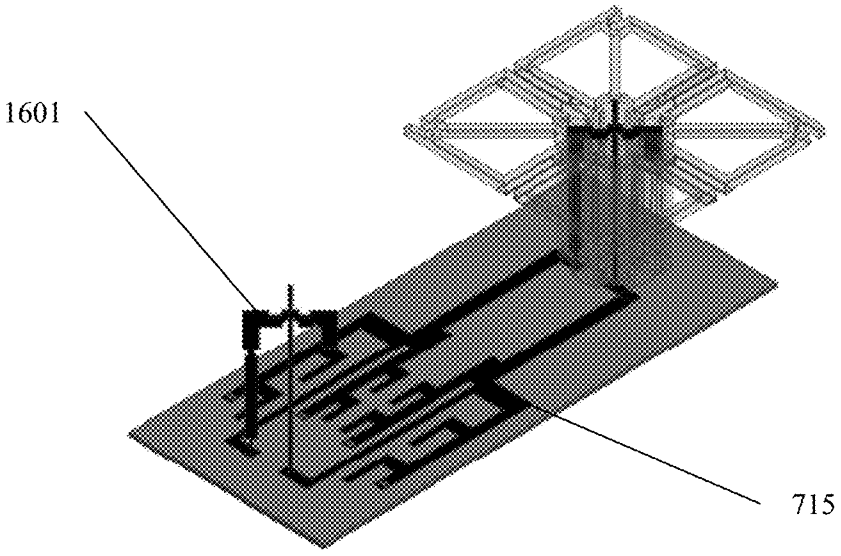
FIG. 16 is a schematic diagram of a three-dimensional structure of a radiating element according to an embodiment of this application.

The foregoing describes the feed network, and the following describes the radiating element 711 in this example. FIG. 15 is a schematic top view of the radiating element 711. FIG. 16 is a schematic diagram of a three-dimensional structure of the radiating element 711. Each radiating element 711 includes four square dipoles, the four dipoles are all connected to one end of a feed pin 1601 of the radiating element 711, and the four dipoles are a first dipole 1611, a second dipole 1612, a third dipole 1613, and a fourth dipole 1614. The first dipole 1611 and the third dipole 1613 are symmetrical dipoles, and the second dipole 1612 and the fourth dipole 1614 are symmetrical dipoles. A first metal arm is connected to a diagonal line of the first dipole, a second metal arm is connected to a diagonal line of the third dipole 1613, and the first metal arm 1621 and the second metal arm are disposed in a straight line. A third metal arm is connected to a diagonal line of the second dipole, a fourth metal arm is connected to a diagonal line of the fourth dipole 1614, and the third metal arm 1623 and the fourth metal arm 1624 are disposed in a straight line. The straight line in which the first metal arm 1621 and the second metal arm 1622 are disposed is a first straight line, the straight line in which the third metal arm 1623 and the fourth metal arm 1624 are disposed is a second straight line, and the first straight line and the second straight line perpendicularly intersect.

As shown in FIG. 16, the first conductor strip in the microstrip circuit 715 is connected to the feed pin 1601 of the radiating element 711. Specifically, a signal of the antenna is first input from outside to an input port of the stripline cavity structure 716, then distributed by the stripline cavity structure 716 to the microstrip circuit 715 that is directly above the reflecting plate 712, and then fed by the microstrip to the four metal arms of the radiating element 711. Signal radiation is generated by resonance of the arms of the radiating element 711. Because the dipoles are dual-polarized, a radiated signal is also dual-polarized.

It should be noted that, in this embodiment, the radiating element 711 directly above the reflecting plate 712 is a dual-polarized element. Certainly, a single-polarized antenna can also achieve the same effect. Each microstrip circuit 715 has two independent signal cables that are respectively connected to two polarized radiating elements 711, and polarization of the dual-polarized elements is perpendicular to each other.

It should be noted that the structure of the radiating element 711 is used as an example for description. The dipoles may alternatively be in another shape, for example, a circle. This is not specifically limited in this application.

Figure 17:
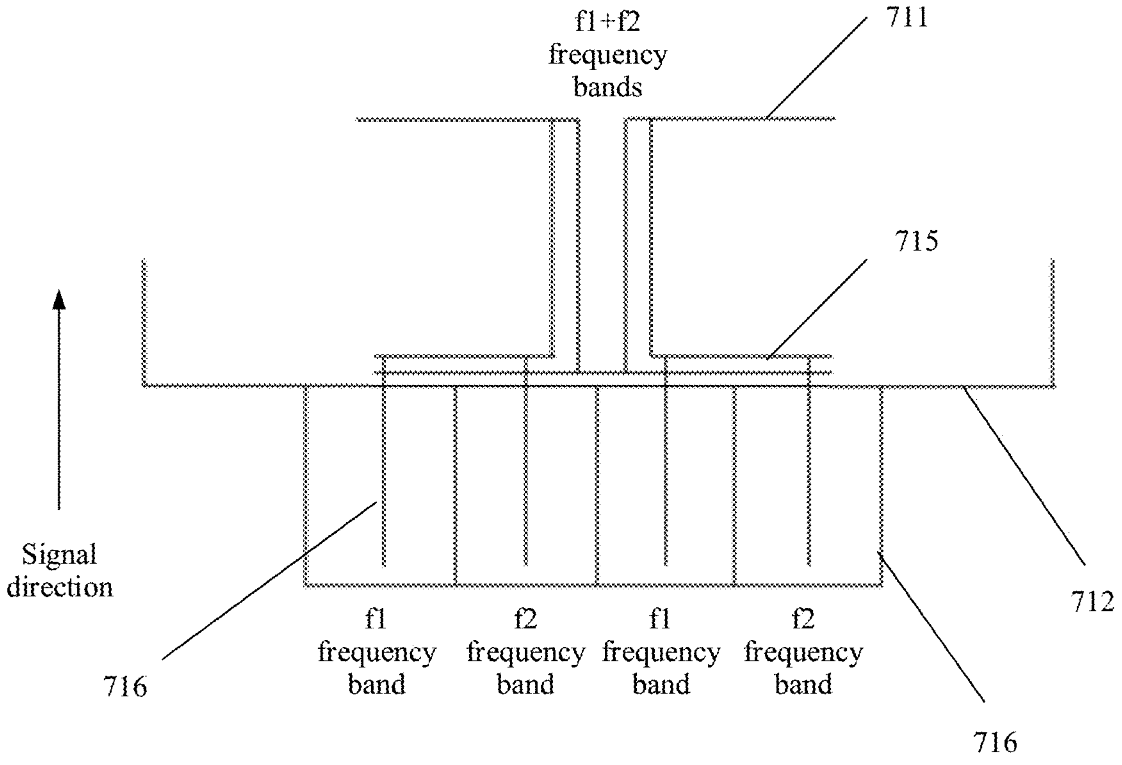
FIG. 17 is a schematic side view of an array antenna according to an embodiment of this application.
Figure 18:
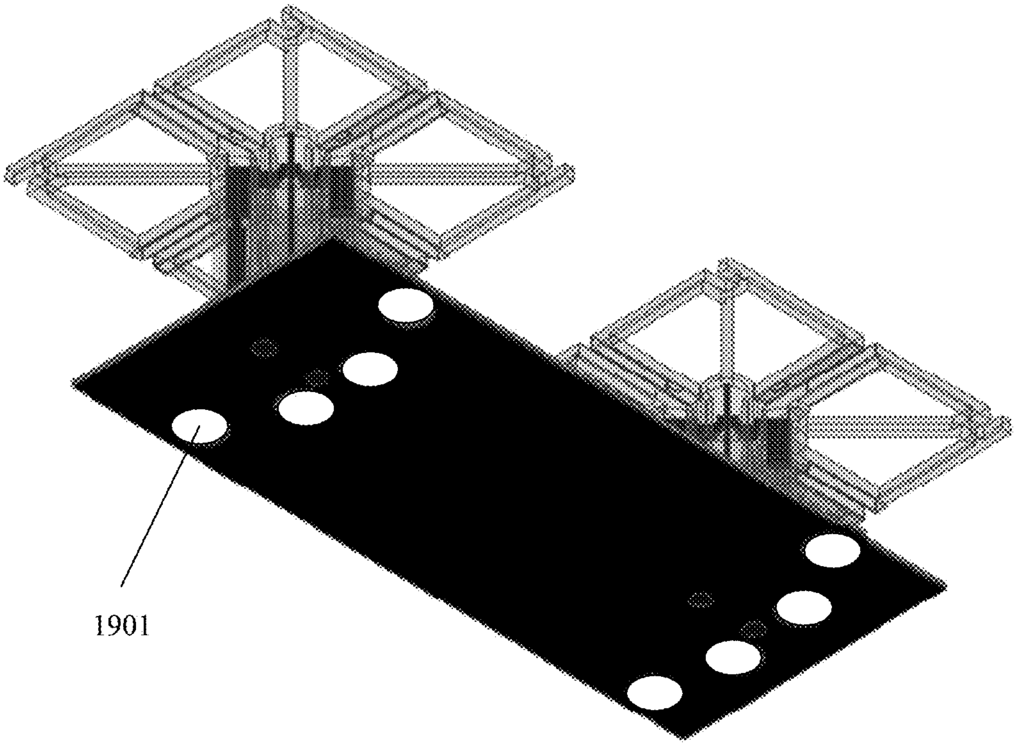
FIG. 18 is a schematic bottom view of a reflecting plate of an array antenna according to an embodiment of this application.

Refer to FIG. 17 and FIG. 18. FIG. 17 is a schematic side view of the array antenna. FIG. 18 is a schematic bottom view of the reflecting plate 712 of the array antenna. There are N stripline cavity structures 716, where N is an integer greater than or equal to 2. In this embodiment, N=4 is used as an example for description. Signal transmission frequencies of second conductor strips 716 in the N stripline cavity structures 716 are different, and a circuit of the microstrip circuit 715 is a combiner. The protruding structures on the second conductor strip pass through the first avoidance holes 7121 and the second avoidance holes 1901 so as to be connected to the first conductor strip of the microstrip circuit 715. In this way, combination of the base station antenna is very easily implemented when required. Correspondingly, the stripline cavity structures 716 need to appear in pairs, to be specific, at least a stripline cavity structure 716 of an f1 frequency band and a stripline cavity structure 716 of an f2 frequency band appear in pairs at the same time. A power splitter on each polarization path has two outlets, and the two outlets are respectively connected to conductors in striplines of the f1 frequency band and the f2 frequency band.

Optionally, there are N stripline cavity structures 716, where N is an integer greater than or equal to 2. In this embodiment, N=2 is used as an example for description. Signal transmission frequencies of conductor strips in the N stripline cavity structures 716 are the same, and a circuit of the microstrip circuit 715 is a power splitter.

Figure 19:
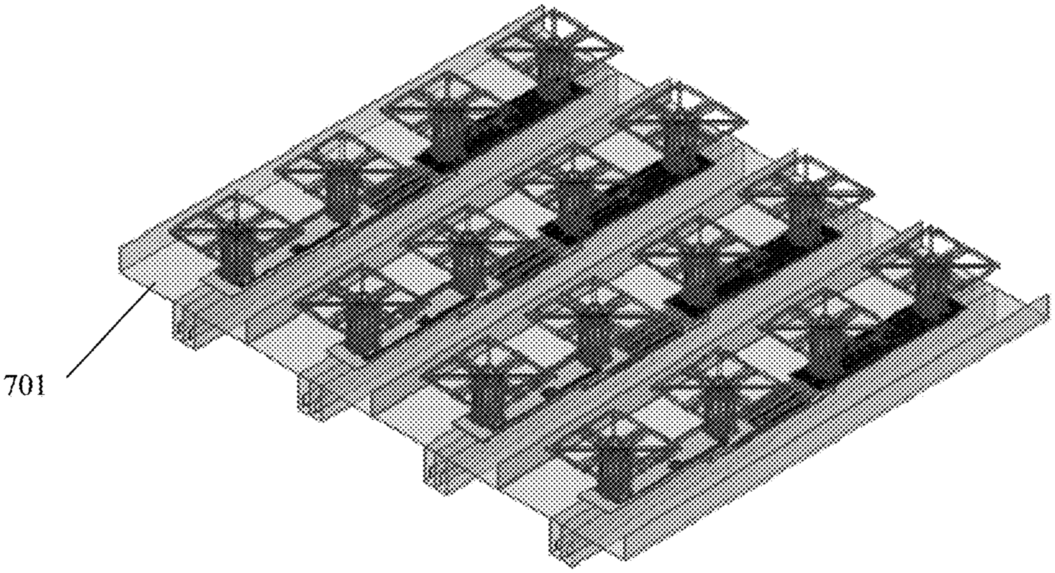
FIG. 19 is a schematic structural diagram of a base station antenna according to an embodiment of this application.
Figure 20:
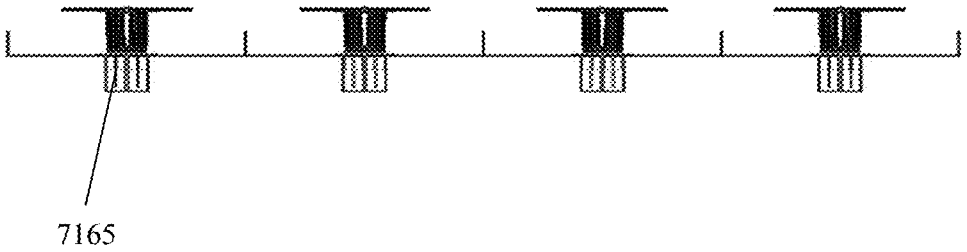
FIG. 20 is a schematic structural side view of an array antenna according to an embodiment of this application.
Figure 21:
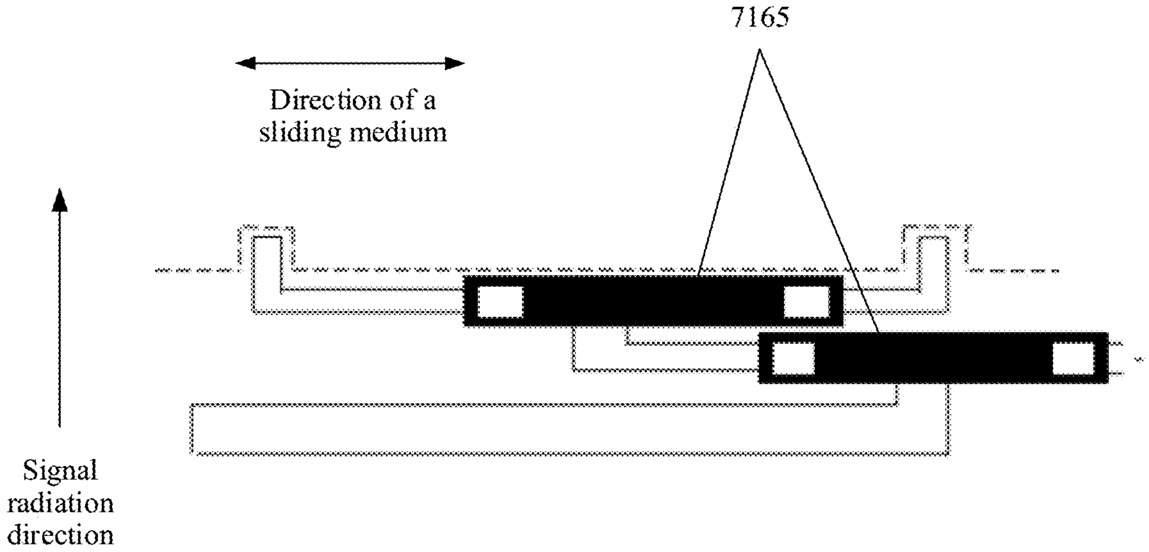
FIG. 21 is a schematic structural diagram of a sliding medium according to an embodiment of this application.

Based on the foregoing embodiment, an embodiment of this application further provides a base station antenna. FIG. 19 is a schematic structural diagram of a base station antenna. In this embodiment, the base station antenna includes the foregoing four array antennas 701, and a specific structure of each array antenna 701 is the same as the structure of the foregoing array antenna 701. Details are not described herein again. One array antenna 701 includes two microstrip circuits 715. In this example, the base station antenna includes eight microstrip circuits 715. One array antenna 701 includes four radiating elements 711, and the base station antenna includes 16 radiating elements 711 in total. Referring to FIG. 20 and FIG. 21, one array antenna 701 includes two sliding medium pairs, the sliding medium pair includes two sliding media, and the base station antenna includes eight sliding medium pairs.

Figure 22:
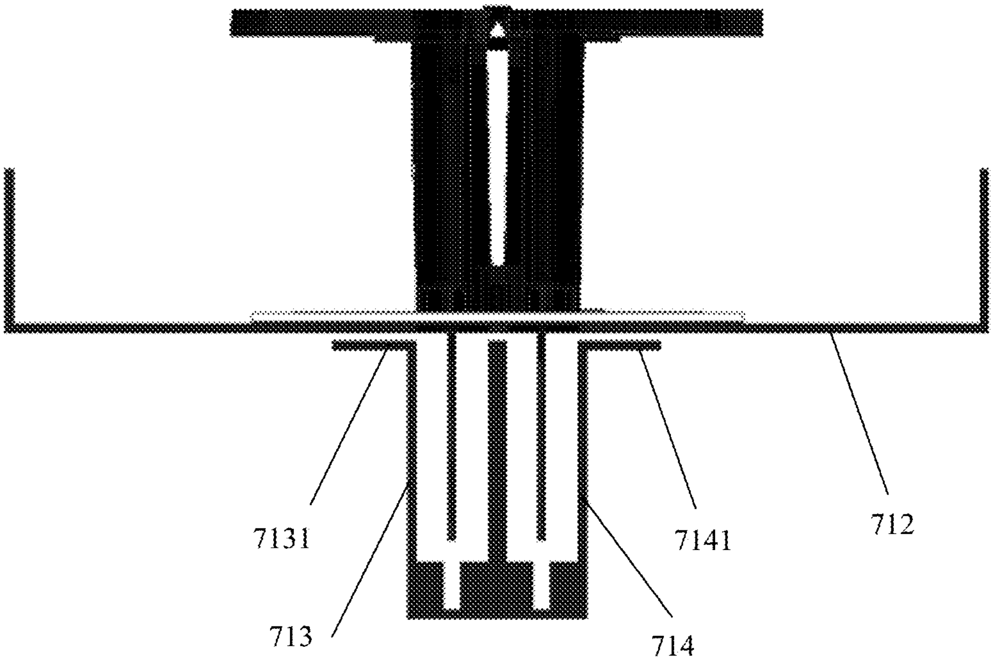
FIG. 22 is a schematic structural side view of an array antenna according to an embodiment of this application.

Optionally, in this embodiment, the ground plate of the stripline cavity is electrically connected (directly connected or coupled) to the reflecting plate 712 in an operating frequency band of the radiating element 711, and an available manner of direct connection is screw fastening. Refer to FIG. 22. One end of the first ground plate 713 is connected to one end of a first plate 7131, the second ground plate 714 is connected to one end of a second plate 7141, the first plate 7131 is coupled to the back surface of the reflecting plate 712, the second plate 7141 is coupled to the back surface of the reflecting plate 712, and an available manner of coupling is ensuring that a gap between the first plate 7131 and the reflecting plate 712 meets a coupling requirement in the operating frequency band.

In this embodiment of this application, a quantity of connection points (usually soldering points) between the second conductor strip and the first conductor strip in the entire feed network is less than that in the prior art. A loss of the entire network is very low. The power splitter and the phase shifter that are designed by using a stripline structure are all completed in the stripline cavity structure, so that the loss of the entire network is very low. The base station antenna in this embodiment of this application has a simple structure, is easy to assembly, and can greatly improve product assembly efficiency.

Figure 23:
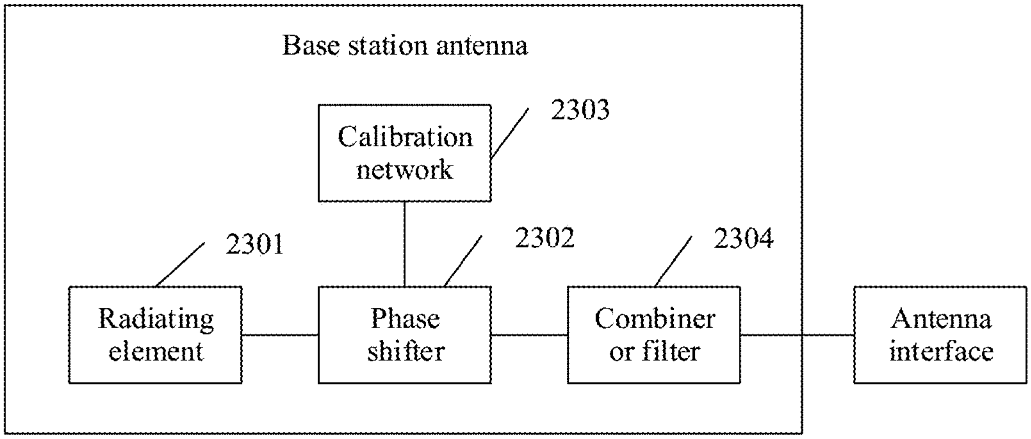
FIG. 23 is a schematic structural diagram of a base station antenna according to an embodiment of this application.

Further, FIG. 23 is a schematic structural diagram of a base station antenna. The base station antenna includes several array antennas including radiating elements 2301 of different frequencies, and the array antennas receive or transmit radio frequency signals through respective feed networks. A phase shifter 2302 is configured to change a phase difference between the radiating elements of the array antennas, so that a particular downtilt angle is formed a vertical beam of the antenna. The feed network may implement different radiation beam directions by using a transmission component, or may be connected to a calibration network 2303 to obtain a calibration signal required by a system. A module configured to extend performance, such as a combiner or a filter 2304, may also exist between the feed network and a port of the base station antenna.

Figure 24:
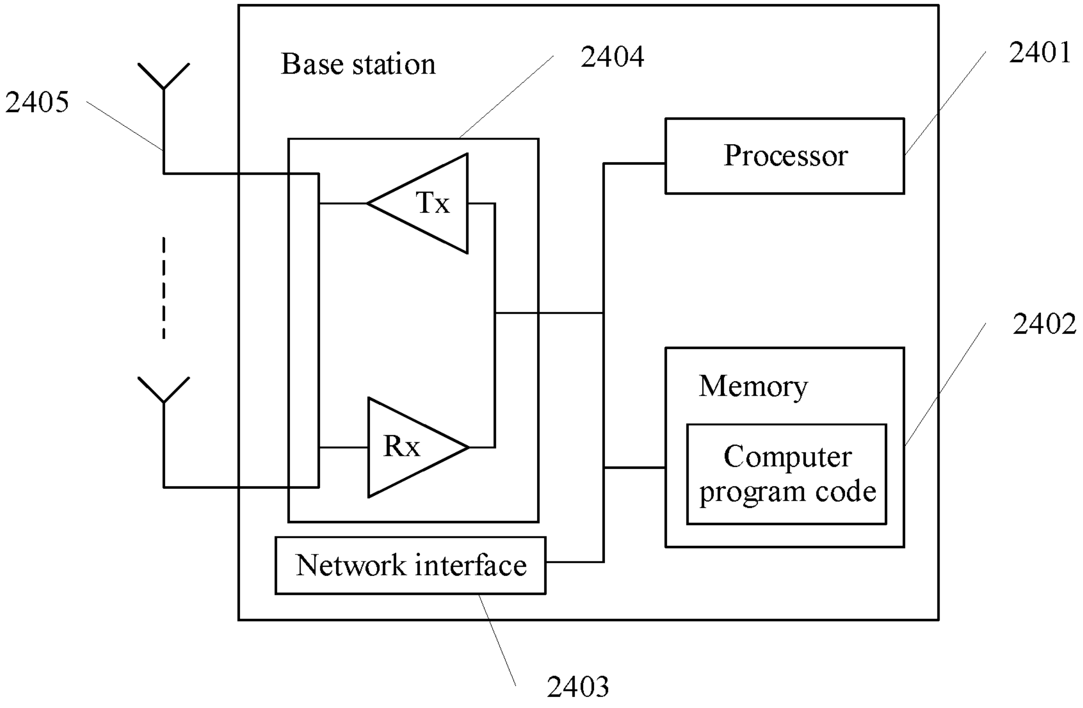
FIG. 24 is a schematic structural diagram of a base station according to an embodiment of this application.

FIG. 24 is a schematic structural diagram of a base station. An embodiment of this application further provides a base station. The base station provides wireless access of user equipment to a network, and includes one or more processors 2401, one or more memories 2402, one or more network interfaces 2403, and one or more transceivers 2404 (each transceiver includes a receiver Rx and a transmitter Tx). The one or more processors 2401, memories 2402, network interfaces 2403, and transceivers 2404 are connected through a bus. The one or more transceivers are connected to the base station antenna 2405 in the foregoing embodiment. The one or more processors include computer program code. The network interface is connected to a core network through a link (for example, a link between the network interface and the core network), or is connected to another base station through a wired or wireless link.

In the several embodiments provided in this application, it should be understood that the disclosed system, apparatus, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

What is claimed is:

1. A base station antenna, comprising:

an array antenna, wherein the array antenna comprises a reflecting plate having a plurality of holes, a microstrip circuit, a stripline cavity structure, and a plurality of radiating elements;

wherein the microstrip circuit comprises a first conductor strip;

wherein the stripline cavity structure comprises a second conductor strip, a first ground plate, and a baffle plate, wherein a top end of the first ground plate is connected to the reflecting plate, wherein a bottom end of the first ground plate is connected to the baffle plate, wherein the microstrip circuit is located at a first side of the reflecting plate, and wherein the stripline cavity structure is located at a second side of the reflecting plate; and wherein the first conductor strip and the second conductor strip are connected through the plurality of holes.

2. The base station antenna according to claim 1, wherein the stripline cavity structure further comprises a second ground plate, a top end of the second ground plate is connected to the reflecting plate, and a bottom end of the second ground plate is connected to the baffle plate.

3. The base station antenna according to claim 2, wherein the baffle plate comprises a slot, and the slot is parallel to the first ground plate.

4. The base station antenna according to claim 3, wherein the plurality of holes are linearly arranged, and an extension direction of the slot corresponds to an extension direction of the plurality of holes.

5. The base station antenna according to claim 3, wherein the baffle plate further comprises an opening groove, and the opening groove is perpendicular to the slot.

6. The base station antenna according to claim 2, wherein the first ground plate, the second ground plate, and the baffle plate are integrally formed.

7. The base station antenna according to claim 1, wherein the stripline cavity structure further comprises a sliding medium.

8. The base station antenna according to claim 7, wherein the second conductor strip comprises a first convex structure on one end of the second conductor strip and a second convex structure on another end of the second conductor strip, and the sliding medium is between the first convex structure and the second convex structure.

9. The base station antenna according to claim 1, wherein the second conductor strip is a Printed Circuit Board (PCB) structure.

10. The base station antenna according to claim 1, wherein the microstrip circuit is parallel to the reflecting plate.

11. The base station antenna according to claim 1, wherein one end of the second conductor strip has a convex structure, and the convex structure is used to pass through the plurality of holes to be electrically connected to the first conductor strip.

12. A base station, comprising:

a base station antenna, wherein the base station antenna comprises an array antenna, and wherein the array antenna comprises a reflecting plate having a plurality of holes, a microstrip circuit comprising a first conductor strip, a stripline cavity structure, and a plurality of radiating elements;

wherein the stripline cavity structure comprises a second conductor strip, a first ground plate, and a baffle plate, wherein a top end of the first ground plate is connected to the reflecting plate, wherein a bottom end of the first ground plate is connected to the baffle plate, wherein the microstrip circuit is located at a first side of the reflecting plate, and wherein the stripline cavity structure is located at a second side of the reflecting plate; and wherein the first conductor strip and the second conductor strip are connected through the plurality of holes.

13. The base station according to claim 12, wherein the stripline cavity structure further comprises a second ground plate, a top end of the second ground plate is connected to the reflecting plate, and a bottom end of the second ground plate is connected to the baffle plate.

14. The base station according to claim 13, wherein the baffle plate comprises a slot, and the slot is parallel to the first ground plate.

15. The base station according to claim 14, wherein the plurality of holes are linearly arranged, and an extension direction of the slot corresponds to an extension direction of the plurality of holes.

16. The base station according to claim 14, wherein the baffle plate further comprises an opening groove, and the opening groove is perpendicular to the slot.

17. The base station according to claim 13, wherein the first ground plate, the second ground plate, and the baffle plate are integrally formed.

18. The base station according to claim 10, wherein the second conductor strip is a Printed Circuit Board (PCB) structure.

19. The base station according to claim 12, wherein the second conductor strip comprises a first convex structure on one end of the second conductor strip and a second convex structure on the other end of the second conductor strip.

20. The base station according to claim 19, wherein the stripline cavity structure further comprises a sliding medium, wherein the sliding medium is between the first convex structure and the second convex structure.

21. The base station according to claim 12, wherein the microstrip circuit is parallel to the reflecting plate.

* * * * *